Oct. 4, 1960     J. F. KEVILLE, JR     2,954,822
APPARATUS FOR RECONSTITUTING DEFROSTING LIQUID
Filed April 2, 1956     2 Sheets-Sheet 1

*INVENTOR.*
JESSE F. KEVILLE, JR.
BY
ATTORNEY.

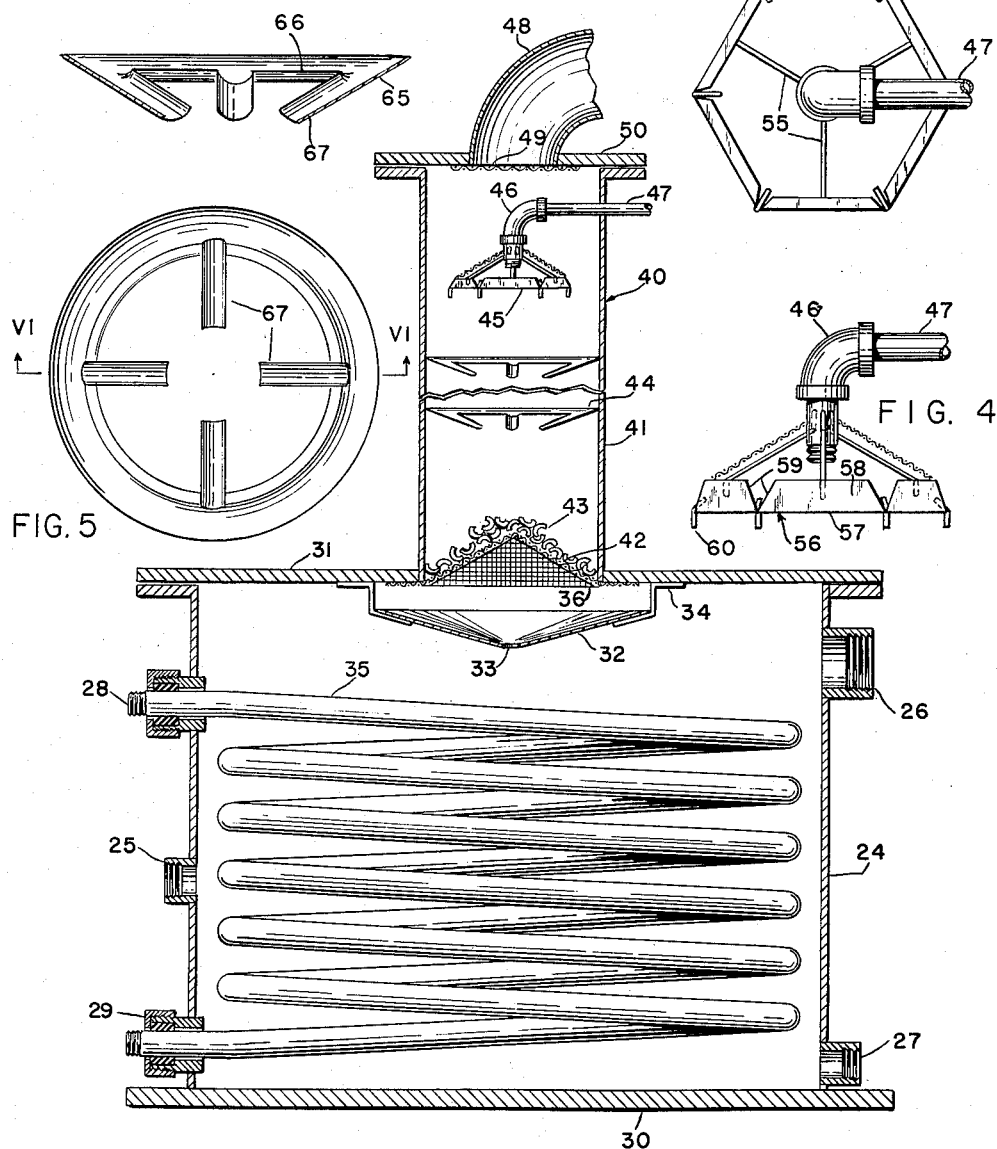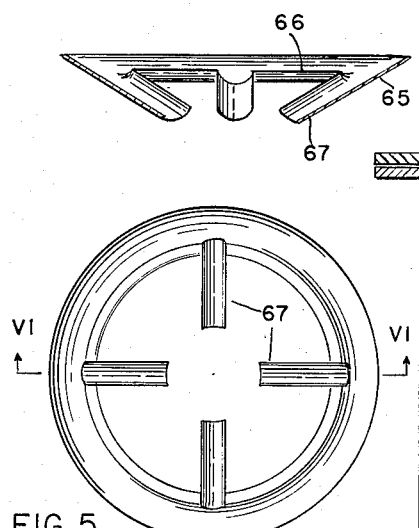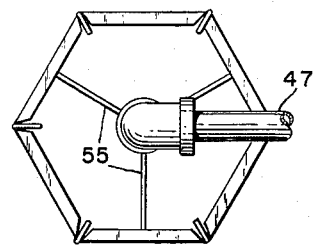

United States Patent Office 2,954,822
Patented Oct. 4, 1960

2,954,822
APPARATUS FOR RECONSTITUTING
DEFROSTING LIQUID

Jesse F. Keville, Jr., Syracuse, N.Y., assignor to Carrier Corporation, Syracuse, N.Y., a corporation of Delaware Filed Apr. 2, 1956, Ser. No. 575,561
3 Claims. (Cl. 159—26)

This invention relates to a defrosting arrangement for a cooling coil, and more particularly to a defrosting arrangement for a cooling coil in which a defrosting liquid of an ethylene glycol type is sprayed on a cooling coil removing the frost therefrom into a sump, from which the diluted defrosting liquid is passed to a concentrator wherein the liquid is reconstituted. This invention also relates to a method for reconstituting diluted defrosting liquid of the ethylene glycol type.

Heretofore, salt brine solutions have been utilized to defrost evaporator coils, however, with the increase in applications requiring lower temperatures the brine has been found to be inadequate for the purpose. Salt type brines are usually wasted as they become diluted and additional salt material has to be added periodically. Corrosion and contamination problems are also evident with salt brines. A natural defrosting fluid overcoming these objections is ethylene glycol. However, the economics of such a use dictate the need for apparatus to reconstitute the diluted ethylene glycol.

To accomplish this a concentrator is used to reconstitute the glycol. This unit comprises a fractionating column through which is passed vapor from the defrosting liquid in substantial counterflow with a refluxing agent which strips the glycol from the vapor. This refluxing agent normally is city or tap water. Ethylene glycol per se is a corrosive material but by the use of suitable inhibitors it may be rendered comparatively inert. It has been found in the present use that when refluxing agent as tap water is utilized the chlorides, carbonates, and other impurities in the water react with certain of the inhibitors or with the metals of construction in such a way as to counteract the protective effect of the inhibitors and permit corrosion of metal surfaces.

This reaction with the metal surfaces or coatings creates a voluminous mass of solid matter which contaminates the defrosting liquid and fills up the reboiler section in the concentrator and other parts of the piping and system.

The chief object of the present invention is to provide a method and apparatus for reconstituting a defrosting liquid which has been used to remove frost from a cooling coil by being sprayed thereon.

An object is to provide an apparatus for reconstituting defrosting liquid in a manner which is efficient and one in which the liquid is not contaminated.

A further object is to provide a concentrator with a fractionating column utilizing a novel source of reflux fluid.

A further object is to provide an apparatus for reconstituting defrosting fluid, employing a fractionating column having a novel eliminator, distributing means, and conical wiper. Other objects of the invention will be readily perceived from the following description.

This invention relates to a defrosting system using an inhibited ethylene glycol as a defrosting liquid. The system comprises a plurality of spray nozzles adapted to substantially cover a cooling coil with defrosting fluid so that the frost is prevented from forming thereon and the resultant diluted defrosting liquid is collected into a sump. Means are provided for circulating liquid from the sump to the spray nozzles; a portion of the recirculated liquid is passed to a recirculating tank from which a portion of the liquid is reintroduced into the sump. Means are provided for removing liquid from the sump to a concentrator; the concentrator comprises a reboiler section and fractionating column. A heat exchanger is placed in the reboiler and the defrosting liquid introduced therein is passed into the fractionating column in a vapor form. Condensate is passed to a reflux reservoir, the condensate then passing into the upper portion of the fractionating column. The fractionating column is filled with a suitable packing mass; distributing means are provided in the upper portion of the fractionating column which distributes the condensate over the packing mass in substantial counterflow to the defrosting liquid vapor passing up through the packing. During the heat exchange process between the condensate wetted packing and the defrosting liquid vapor passing therethrough, the glycol in the defrosting liquid is condensed and passed back into the reboiler. Means are provided for passing reconcentrated defrosting liquid from the reboiler back to the recirculating tank.

This invention also relates to a method for concentrating a defrosting liquid comprising the steps of passing steam into heat exchange relation with the diluted defrosting liquid, vaporizing a portion of the defrosting liquid, and passing the so-formed vapor into a fractionating column having a packing mass therein. Simultaneously, steam in heat exchange with the defrosting liquid is condensed. The condensate is passed into a reflux reservoir, a portion of this condensate from the reflux reservoir being introduced into the upper portion of the fractionating column. This refluxing agent (condensate) is passed into a distributing means which wets the packing mass surfaces with the condensate. The defrosting liquid vapor passes in substantial counterflow relation with the condensate wetted surfaces condensing the glycol in the defrosting liquid vapor, the condensed glycol returning to the reboiler and passing out of the concentrator.

The attached drawings illustrate a preferred embodiment of the invention, in which:

Figure 2 is a sectional view of the concentrator used in the present invention;

Figure 3 is a plan view of the distributor member;

Figure 4 is a view in elevation of the distributor member;

Figure 5 is a view in plan of the conical wiper member; and

Figure 6 is a sectional view of the conical wiper member taken along the line VI—VI of Figure 5.

Figure 1:
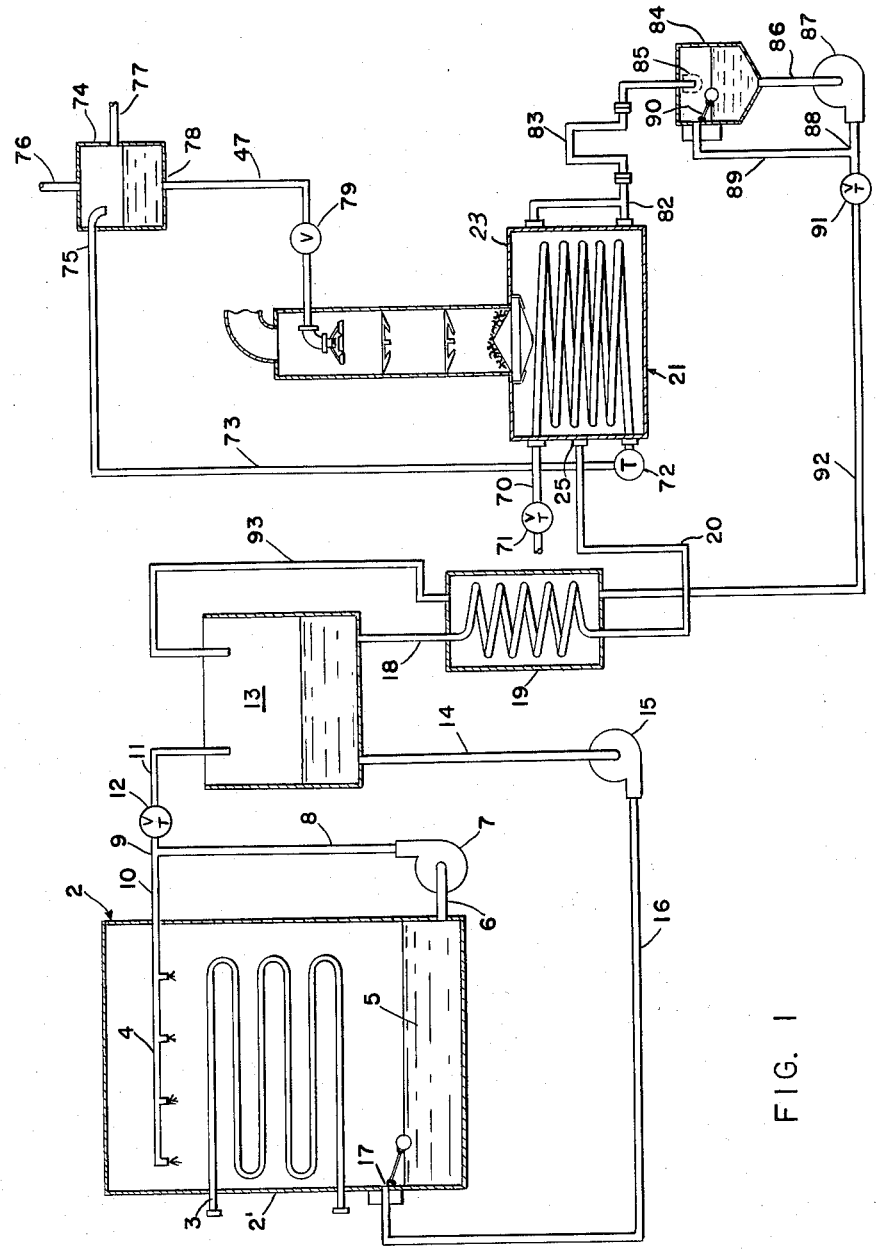
Figure 1 is a schematic view of the invention.

Referring to the drawings, there is shown in Figure 1 a system for low temperature applications including a cooling coil, means for spraying an ethylene glycol type defrosting liquid over the exterior surfaces of the coil, and means for reconstituting the defrosting liquid. It will be understood, that the term "cooling coil" as used herein includes heat exchange circuits through which cooling medium is passed. Usually it is the evaporator section of a refrigeration system wherein the liquid refrigerant is expanded imparting a cooling effect to medium in heat exchange relation therewith.

The low temperature cooling coil arrangement shown may be of the type manufactured by the Carrier Corporation and sold under the trademark "Cold Diffuser." This unit includes a casing 2 containing a cooling coil 3, a plurality of spray nozzles 4 adapted to spray defrosting liquid over the exterior surfaces of the coil, and a sump 5 placed below the coil adapted to collect the diluted defrosting liquid dropping from the coil. The unit is provided with a suitable fan or other means (not shown) for passing an air stream through the coil in counterflow relation with the defrosting liquid.

Pump 7 withdraws liquid from sump 5 through line 6 and forwards the liquid through line 8 to a T fitting 9; one branch of the juncture is connected to line 10, fluid being supplied through line 10 to the spray nozzles 4.

The other branch from the T 9 is connected to line 11 which leads to recirculating tank 13. A control valve 12 is placed in line 11. Two discharge lines are provided in the recirculating tank 13. Discharge line 14 supplies liquid to the pump 15, which discharges the fluid through line 16 into sump 5. Passage of liquid through line 16 is controlled by the float valve 17, thus regulating the level of liquid within the sump 5.

Discharge line 18 connects the recirculating tank 13 with the heat exchanger 19. Line 20 connects the heat exchanger 19 with the sump of the concentrator 21 to supply liquid therein through inlet 25.

Referring to Figure 2, there is shown an enlarged sectional view of the concentrator 21. The lower portion of the concentrator comprises a reboiler 23 which in essence is a vertically disposed shell 24 containing defrosting liquid inlet 25. The shell 24 is provided with two outlets 26 and 27 placed adjacent the upper and lower ends of the reboiler. Extending into the shell are two connections 28 and 29. Connection 28 is a steam inlet and connection 29 is a steam condensate outlet for the heat exchanger 35 of the reboiler which in the present case is a helical coil. The ends of the cylindrical shell 24 are closed by the end member 30 at the bottom and the end member 31 at the top.

Concentrically located and spaced from an opening in the end member 31 is a downwardly extending frusto conical member 32 which has an opening 33 at substantially the apex of the conical surfaces. This member 32 is supported by suitable struts 34 which maintain the member in spaced relation from the end member 31.

Extending from the end member 31 is the fractionating column 40 of the concentrator. This fractionating column 40 comprises a vertical cylindrical shell 41 of a smaller diameter than the shell 24. This fractionating column is in communication with the reboiler section 23 through the opening 36 in the member 31. Adjacent to this juncture there is located a conically shaped screen 42, having its apex pointed in an upward direction. A suitable packing material 43 which may be of any of the well known types, such as Raschig rings or ceramic saddles is placed in the shell of fractionating column 40. This packing material substantially fills the entire volume of the fractionating column from the screen 42 up to the end 50.

The function of the screen 42 is to maintain the packing mass within the fractionating column and permit proper introduction of the vapor and outlet for the reflux liquid. At spaced intervals within the fractionating column there are shown suitable conical wipers 44, a description of which will be provided hereinafter. Located above the conical wipers is a suitable distributor plate 45, the construction and function of which will also be described hereinafter. A line 47 passes through the upper portion of the fractionating column and has provided at the end thereof a suitable elbow 46 which supplies the refluxing agent into the distributor plate 45. Attached to an opening in the end 50 is a vent line 48 having placed adjacent thereto a suitable screen 49.

Referring to Figures 3 and 4, there is shown a plan and an elevation of the distributor plate utilized in the present invention. A plurality of struts extend from a nipple extending from the elbow 46. These struts 55 extend radially and support a distributor plate 56, which comprises a horizontal planar surface 57 having a general hexagonal shape. Extending along the periphery of this planar surface 57 are suitable walls 58. The intersection of these walls form suitable weirs 59 through which extend rod strips 60. It will be observed that these rod strips are short rods which are bent at an intermediate point, one end of the rod points downwardly in a vertical direction whereas the second section of the rod passes through the weir 59.

Referring to Figures 5 and 6, there is shown a plan view of a conical wiper utilizing the present invention and a sectional view of the wiper taken along the lines VI—VI of Figure 5. Essentially this wiper member comprises a frusto conical member, supported by proper clips or supports (not shown), the outer edge of which is in engagement by use of suitable gasketing with the inner surface of the vertical shell member 41, which forms the casing of the fractionating column. The inner periphery of this conical surface which is pointed in a general downward direction has a flared lip. Referring to Figure 6, it will be readily seen that this flared lip forms an annular trough in the conical wiper member. Extending in the same surface as the frusto conical section of the member are a plurality of channels 67 which are in the present embodiment located at 90° intervals and tend to converge toward the apex of the conical member.

Again referring to Figure 1, it can be seen that steam is introduced to the connection 28 of the concentrator through the line 70. This steam is controlled by a suitable valve 71 in the steam line. Condensate is discharged through the connection 29 into a steam trap 72, which passes the condensate into a line 73. This line passes to a reflux reservoir 74 which has an inlet 75 connected to the line 73. This reflux reservoir 74 is an open vessel, having the aforementioned inlet 75, a vent 76, and an overflow line 77. Liquid is passed from this reservoir through the outlet 78 into the line 47, which as previously mentioned is connected to the distributor plate in the fractionating column 40. Located in this line 47 is a suitable control valve 79, which may include a rotameter which will comprise the control means for determining the amount of reflux passed to the distributor plate 56. The discharge connections 26 and 27 in the shell 24, are joined at the juncture 82, which is connected to a loop 83. This loop is utilized to maintain the liquid level in the reboiler 21. In the present embodiment, this loop 83 is swivelly mounted on two connections so that the uppermost portion of the loop may have its height varied, which in turn will determine the level of the liquid in the reboiler 21. Liquid passing from the reboiler passes through a suitable filter 85 into a suitable feed tank 84, which discharges into line 86 to the pump 87. Pump 87 passes liquid to the juncture 88, at which point there extends a branch 89 to the float valve 90. This float valve determines the level of fluid within the feeder tank 84 and, in this manner, maintains a suitable suction head on the pump 87. The other branch of the juncture 88 extends into line 92 which has located therein control valve 91, which controls the amount of liquid passing through said line 92. Line 92 is connected to the heat exchanger 19, thus supplying hot fluid to exchanger 19 in heat exchange relation with cold fluid being supplied to the concentrator. Line 93, returns fluid from exchanger 19 to the recirculating tank 13.

Considering the operation of the system shown in Figure 1, air is passed over the coil 3 and, because of its extremely low temperature, moisture therein is subsequently condensed and forms frost. However, simultaneously there is emitted through the spray nozzles 4 a suitable defrosting liquid of an ethylene glycol type, this defrosting liquid passing over the evaporator coil 3 and preventing the formation of frost thereon. The diluted defrosting liquid falls into the sump 5, from where it is passed through the line 6, through the pump 7, through the line 8, to the juncture 9. A great portion of this liquid passes into the branch 10 and is again sprayed through the nozzles 4. It will be noted that a recirculating action is taking place.

However, at the juncture 9 a portion of the defrosting liquid which has been diluted is passed through line 11 in quantities determined by the valve 12, and introduced into the recirculating tank 13. Simultaneously, as liquid from the sump 5 is passed into the recirculating tank 13, reconstituted defrosting liquid is introduced into the recirculating tank 13 through the line 93. It will therefore be appreciated that there is a mixing action taking place in the recirculating tank 13 to provide a liquid of desired concentration. The defrosting liquid of desired concentration is passed through the line 14 into the pump 15, which passes the liquid through line 16 to the level control valve 17, which insures a proper level in the sump 5.

Considering this part of the system, it will be noted that liquid is being circulated from a sump to the spray nozzles, back to the sump, while simultaneously a small portion of this liquid is bled from the circuit and partially reconcentrated. Simultaneously a small portion of reconcentrated liquid is reintroduced into the sump, thereby keeping the concentration of the defrosting liquid in the sump substantially constant.

It is noted that a second outlet is provided in the recirculating tank 13. Liquid leaving the recirculating tank passes through the line 18 and subsequently into heat exchange relation with the liquid passing through the line 93 on its way to the recirculating tank 13. This function is carried out in the heat exchanger 19 in which the low temperature of the diluted defrosting liquid passing from the recirculating tank is utilized to precool reconstituted defrosting liquid being fed into the recirculating tank 13. As the liquid leaves the heat exchanger 19, it is passed into the reboiler inlet 25. (See Figure 2.) As liquid is being introduced into the reboiler, its level is determined by the loop 83 in a manner previously mentioned. Simultaneously, steam is passed through the control valve 71 through the line 70 into the heat exchanger 35. As the steam passes through the heat exchanger 35, the temperature of the diluted defrosting liquid is increased. As the temperature of the liquid in the reboiler is increased, a portion thereof will be vaporized. Since the vaporizing process entails a boiling type operation, it will be readily appreciated that the likelihood of passing entrained liquid from the reboiler is quite probable. In order to avoid this, an eliminator type structure is provided at the entrance to the fractionating column. In the present invention this structure comprises a frusto conical member which is concentric with the opening into the fractionating column. As the vapor is formed in the reboiler, the entrained liquid particles will bounce and strike the member 32 and the end of the reboiler 31. However, vapor will be permitted to pass into the fractionating column by passing the space between the end member 31 and the edge of the conical member 32. The vapor will then tend to rise through the packing mass 43.

Simultaneously, as the steam is imparting heat to the liquid in the reboiler, a portion of the steam is constantly being condensed and, because of gravity, tends to flow toward the connection 29. Adjacent this connection there is located a suitable steam trap which permits the condensate to leave the heat exchanger (see Figure 1). The condensate leaving the coil 35 passes through the steam trap 72 into the line 73, up to the reflux reservoir 74, and enters therein through the inlet 75. It will be appreciated that, since the condensate is driven in an upward direction, steam pressure is relied upon to propel this mass of condensate. Therefore, as the condensate enters the reflux reservoir, some steam will have flashed from the condensate and will enter therein and be exhausted through the vent 36. Since only a small portion of this condensate is to be utilized, an overflow 77 is provided in the reflux reservoir and through this overflow the condensate is passed from the system. The condensate collected in the reservoir is discharged through outlet 78, directed through line 47, metered by the valve 79 and passed into the fractionating column 40.

At this point it will be recognized that an unorthodox procedure is being followed. Steam is introduced into a heat exchanger at the lower portion of the concentrator, condensate is removed from the heat exchanger and passed in an upward direction toward the upper section of the concentrator. Condensate is passed into a reflux reservoir and a portion is then reintroduced into the concentrator. It will be remembered that raw ethylene glycol cannot be used in many applications wherein the glycol is put in contact with certain metal surfaces, because of the corrosive action of the glycol. In order to avoid any reaction between the glycol and any contacting metal, the glycol is suitably inhibited to give the glycol an inert nature. Because of the possible low temperature application involved, a glycol solution of high concentration exists in the sump 5 which may run in the order of 60% glycol. This diluted glycol is then passed into a reboiler where the concentration may be raised to values in the magnitude of 66%. The vapor produced by glycol boiling at this concentration will contain about 6% glycol. It will be readily appreciated that operating such a system would eventually dissipate the entire defrosting fluid supply used in the system.

In order to reclaim the glycol in the vapor, water is used as a reflux agent. As glycol vapor is passed through a fractionating column, the reflux water is passed downwardly in intimate counterflow with this defrosting fluid vapor. Since the fractionating column is made up of a mass of packing elements, this reflux water will substantially wet all the surfaces of the packing. The vapor from the reboiler passes through the column and into mass transfer relation with the wetted packing surfaces. Because of the comparatively low vapor pressure of the glycol in the vapor, the glycol will tend to condense and form on the wetted packing elements and be conducted back into the reboiler. Since the water content of the defrosting liquid has a higher vapor pressure, it will not be substantially condensed by the reflux water and it will pass out through a suitable vent in the fractionating column. Actually a portion of the water reflux evaporates into the vapor stream to replace the glycol condensed. This may be shown by simple thermodyamic computations.

The prior practice has been to introduce tap water into the fractionating column as reflux. Since the tap water included many impurities, such as chlorides and carbonates, a chemical reaction took place between the carbonates, chlorides, and other impurities in the tap water and the inhibitor or in the ethylene glycol and the metal surfaces. It will be readily appreciated that this immediately contaminated the defrosting liquid supply. This, however, was further aggravated by another reaction. The products of the reaction between the chlorides and carbonates and the inhibitor in the glycol or the metal surfaces contain certain by-products which will precipitate and foul or clog the system. For example, the chlorides would react with the coating employed on the evaporator coil, forming metal chlorides such as, for example, in the case of a galvanized coil, zinc chloride; which in turn formed further insoluble solid masses as a result of interaction with certain of the inhibitors. These masses would plug pipe lines and tubes and deposit in the sump of the cooling coil system and in the reboiler of the concentrator.

In order to avoid these undesirable chemical reactions, a supply of water other than tap water is needed. Such a supply of pure water is normally difficult to obtain. Normal steam produced by a reasonably well operated boiler plant has been shown to contain no detrimental impurities for this purpose. Recalling that the condensate formed in the heat exchanger in the reboiler is substantially pure water a solution to the problem is found. This water is used by introducing it into the reflux reservoir where a small portion is stored and subsequently passed into the fractionating column as the reflux. Recognizing that the process carried on in the fractionating column is a separating process, wherein most of the glycol vapor is replaced by water vapor through mass diffusion, and the water vapor is permitted to pass from the column, the high temperature of the condensate flowing from the heat exchanger in the reboiler is no disadvantage. This condensate water temperature after flashing to atmospheric pressure in the reservoir, is substantially lower than the boiling temperature of the glycol; however, it is the same temperature substantially as the water vapor rising through the column. Therefore by utilizing condensate as a reflux the maximum amount of glycol vapor will be stripped from the vapor mixture while essentially a zero net amount of water vapor will be condensed permitting all the water vapor to pass from the system. This reflux, because of its high purity, will not react with the inhibitors in the ethylene glycol and because of its origin as condensate it is at a sufficiently high temperature to effectively enter into the fractionating process and efficiently carry out the separating action. This source of reflux, it will again be noted is conveniently and economically obtained and it solves a grave problem.

Referring again to Figure 2, it will be noted that the fractionating column substantially is filled with the packing material 43. The condensate used as reflux is introduced through the line 47, through the elbow 46, onto the distributing plate 56. This water will tend to flow out of the various weirs 59 and into the packing mass. An even distribution of water is insured because the rods 60 prevent water from wetting the lower side of the distributor plate, thereby causing uncontrolled wetting of the packing mass. In the present embodiment, six weirs are provided forming six places of water introduction into the packing mass. Since a saddle type packing is normally used in this type fractionating column, it will be appreciated that a greater number of spaces will be presented along the inner periphery of the fractionating column, and there will be a tendency of the reflux to channel and to pass down the peripheral walls of the fractionating column without wetting the packing members. To avoid such bypass, a plurality of conical wiping members of a unique design are provided. These wiping members, as previously noted, are in essence frusto conical shaped members which tend to divert reflux and gases passing along the peripheral area of the fractionating column toward the center section of the column. It will be appreciated that this tendency to pass back toward the periphery of the column will continue; however, by suitable spacing of these wiper members, this channeling action can be prevented. Considering the action of the present members, because of the flared lip provided on the frusto conical members, a substantially annular trough is provided to collect the reflux passing in the vicinity of the peripheral area of the fractionating column. There are provided four channels set in a converging arrangement extending from this annular trough area. Reflux captured in this annular trough is passed into the channel which tends to divert the reflux toward the center section of the fractionating column. In such a manner, a substantial, even wetting of the packing members is insured with a minimum of impedance to the defrosting liquid vapor passing upwardly through fractionating column. By utilizing such wiper constructions, the glycol recovery efficiency of the fractionating column is substantially increased by its increased effectiveness in maintaining a substantially evenly wetted packing mass and simultaneously providing a minimum of impedance against the flow of vapor through the packing mass. As this reflux continues to pass downwardly, in the fractionating column, it continues to condense particles of glycol until the resulting mass of liquid passes through the screen 42 onto the inner surface of the frusto conical member 32 and out through the center opening 33 into the mass of liquid in the reboilers.

Continuously fluid is withdrawn through the outlet connections from the reboiler, through the juncture 82, through the level maintaining loop 83, and into the feeder tank 84. Prior to the passage of liquid into the feeder tank 84 the liquid is passed through a suitable filter 85.

The fluid in the feeder tank is then passed through the line 86 into the pump 87, which passes the liquid to the juncture 88, where a portion of the liquid passes through the line 89 up to the float valve 90 which maintains the level in the feeder tank, thereby insuring a proper head upon the pump 87. The remainder of the liquid at the juncture 88 passes through the control valve 91 through the line 92 into the heat exchanger 19. Since the temperature of the liquid through the line 92 is extremely high, a convenient heat exchange process takes place in the heat exchanger 19 in which the cold liquid removed from the recirculating tank 13 is heated before entry into the concentrator 21, thereby insuring the economical use of steam used in the reboiler. Simultaneously, it will be appreciated that the introduction of hot defrosting liquid into the evaporator will, in effect, offset part of the refrigerating effect carried on by the cooling coils. The heat exchanger 19, therefore, chills the hot defrosting liquid passing from the concentrator 21 so that the reconstituted defrosting liquid introduced into the recirculating tank 13 will be of a substantially low temperature which will not unduly load the cooling coil 3.

Reconsidering the system and method of operation outlined, it will be seen that a novel method of operation is provided in which a substantially pure and high temperature reflux is acquired from a liquid normally passed from the reboiler of the concentrator as waste. There is also provided a novel concentrator employing unique elements which further increase the efficiency of the concentrator.

While I have described a preferred embodiment of the invention, it will be understood the invention is not limited thereto since it may be otherwise embodied within the scope of the following claims.

I claim:

1. In a defrosting arrangement using an inhibited ethylene glycol as a defrosting liquid, the combination of a cooling coil, a plurality of spray nozzles adapted to substantially cover said coil with defrosting liquid, a sump located beneath said coil and adapted to collect defrosting liquid diluted by melted frost from said coil, means for circulating a portion of the diluted defrosting liquid from said sump to said plurality of spray nozzles, a recirculating tank, means for passing a portion of the diluted defrosting liquid from the sump into said recirculating tank, means for introducing a portion of the diluted defrosting liquid from said recirculating tank into said sump, a concentrator comprising a reboiler section and a fractionating column, means for passing a portion of the diluted defrosting liquid from said recirculating tank to said reboiler section, a heat exchanger located in said reboiler section, means for passing steam into said heat exchanger whereby the diluted defrosting liquid in said reboiler section is fractionally distilled and a portion thereof is vaporized and passed into said fractionating column, means for passing condensate from said heat exchanger to said fractionating column, means for placing said condensate in direct contact with said vapor passing through said fractionating column whereby glycol vapor therein is condensed and returned to said reboiler and means for withdrawing liquid from said reboiler and returning said liquid to said recirculating tank.

2. In a defrosting arrangement adapted for use with a cooling coil of a refrigeration system wherein said defrosting arrangement employs an inhibited ethylene glycol solution of a desired concentration as a defrosting liquid sprayed over the cooling coil by a spraying system and wherein the defrosting liquid is thereby subject to dilution below the desired concentration by moisture removed from the vicinity of the cooling coil during the defrosting process, the combination of a single stage concentrating means to restore the desired concentration of said glycol solution and permit its reuse in the system without substantial loss thereof, said concentrating means comprising a reboiler and a fractionating column, means to collect the diluted glycol solution sprayed over said cooling coil, means to pass at least a portion of the diluted glycol solution from said collecting means to said reboiler, heat exchange means associated with said reboiler adapted to heat the diluted glycol solution passed thereto and to fractionally distill and concentrate the diluted glycol solution in said reboiler thereby forming a vapor comprising chiefly water vapor and a minor fraction of vaporized glycol, means to supply steam to said heat exchange means to provide heat for said fractional distillation process, said concentrating means being provided with means whereby said vapor is passed from said reboiler to said fractionating column, means to supply substantially pure water condensed from said steam supplied to said heat exchange means to said fractionating column as a refluxing agent to reclaim said vaporized glycol, means to permit return of the reclaimed glycol from said fractionating column to said reboiler, and means to pass the glycol concentrated by said concentrating means from said reboiler to the spraying system for reuse therein, said concentrated glycol solution being mixed with said diluted glycol solution.

3. A defrosting system for use with a refrigeration unit of the type having a cooling coil subject to frosting, said system comprising means to discharge a defrosting liquid of the inhibited ethylene glycol type over said cooling coil to remove frost and moisture from said coil thereby diluting said defrosting liquid, means to receive the diluted defrosting liquid, means to recirculate diluted defrosting liquid to the discharge means, and means to reconcentrate said defrosting liquid to enable its reuse in the system, said means to reconcentrate the diluted defrosting liquid comprising a single effect concentrator having a reboiler and a fractionating column, means to supply diluted defrosting liquid from the receiving means to said reboiler, a heat exchanger associated with said reboiler, means to supply steam to said heat exchanger for fractional distillation of the diluted defrosting liquid supplied thereto, means to supply substantially pure water condensed from the steam supplied to said heat exchanger to said fractionating column for refluxing to reclaim vaporized defrosting liquid in said fractionating column, means to return said reclaimed defrosting liquid to said reboiler, and means to return defrosting liquid concentrated by said concentrating means to said receiving means whereby said defrosting liquid is continuously recirculated in said system.

References Cited in the file of this patent

UNITED STATES PATENTS

| | | |
|---|---|---|
| 582,791 | Kennedy | May 18, 1897 |
| 828,524 | Warren | Aug. 14, 1906 |
| 960,223 | Guillaume | May 31, 1910 |
| 1,528,104 | Ewart et al. | Mar. 3, 1925 |
| 2,147,876 | Bauman | Feb. 21, 1939 |
| 2,156,293 | Kaufman | May 2, 1939 |
| 2,176,645 | Smith | Oct. 17, 1939 |
| 2,264,221 | Smith | Nov. 25, 1941 |
| 2,408,290 | Byer | Sept. 24, 1946 |
| 2,510,548 | Brunjes | June 6, 1950 |
| 2,747,382 | Sloan | May 29, 1956 |
| 2,819,887 | Eversole et al. | Jan. 14, 1958 |